(12) United States Patent
Lo

(10) Patent No.: US 8,684,751 B2
(45) Date of Patent: Apr. 1, 2014

(54) CONNECTOR

(71) Applicant: Lintes Technology Co., Ltd., New Taipei (TW)

(72) Inventor: Wei Zen Lo, New Taipei (TW)

(73) Assignee: Lintes Technology Co., Ltd., New Taipei (TW)

( * ) Notice: Subject to any disclaimer, the term of this patent is extended or adjusted under 35 U.S.C. 154(b) by 0 days.

(21) Appl. No.: 13/624,740

(22) Filed: Sep. 21, 2012

(65) Prior Publication Data

US 2013/0072065 A1 Mar. 21, 2013

Related U.S. Application Data

(60) Provisional application No. 61/537,338, filed on Sep. 21, 2011.

(51) Int. Cl.
*H01R 12/00* (2006.01)

(52) U.S. Cl.
USPC ....................................................... 439/76.1

(58) Field of Classification Search
USPC ....................................................... 439/76.1
See application file for complete search history.

(56) References Cited

U.S. PATENT DOCUMENTS

| | | | | |
|---|---|---|---|---|
| 6,652,293 B2 * | 11/2003 | Fuchs et al. | ................... | 439/76.1 |
| 7,798,821 B2 * | 9/2010 | Liu et al. | ...................... | 439/76.1 |
| 2003/0176085 A1 * | 9/2003 | Laker | ........................... | 439/76.1 |
| 2008/0305658 A1 * | 12/2008 | Ko | ................................ | 439/76.1 |
| 2012/0220142 A1 * | 8/2012 | Swier | ........................... | 439/76.1 |

* cited by examiner

*Primary Examiner* — Gary Paumen
(74) *Attorney, Agent, or Firm* — Morris Manning & Martin LLP; Tim Tingkang Xia, Esq.

(57) ABSTRACT

A connector assembly includes a circuit board, a signal plug and a cable. The circuit board has at least one pair of traces of the same length. The signal plug is disposed at a front side of the circuit board, and has at least one pair of terminals of the same length that are respectively conducted to a paired first signal contacts of the pair of traces. The cable extends from the circuit board in a left-right direction and conducts to the circuit board. An extension direction of the cable is substantially perpendicular to an insertion direction of the signal plug. The cable has at least one pair of differential signal lines that are respectively conducted to a paired second signal contacts of the pair of traces.

18 Claims, 6 Drawing Sheets

CONNECTOR

CROSS-REFERENCE TO RELATED APPLICATIONS

This application claims priority to and the benefit of, pursuant to 35 U.S.C. §119(e), U.S. provisional patent application Ser. No. 61/537,338, filed Sep. 21, 2011, entitled "CONNECTOR," by Wei Zen Lo, the disclosure of which is incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to a connector assembly, and more particularly to a connector assembly applicable for synchronous transmission of differential signals.

BACKGROUND OF THE INVENTION

An existing connector assembly includes a signal plug, a cable and a circuit board connecting the signal plug and the cable. The signal plug is disposed at a front side of the circuit board. The cable is substantially perpendicular to an insertion direction of the signal plug. The cable is bent for about 90 degrees at a rear side of the circuit board and then is welded to the circuit board. Since a differential signal needs to be synchronously transmitted, a transmission path is required to have the same length. However, after the cable is bent, lengths of the paired differential signal lines in the cable are not the same. Therefore, a length difference in lines of the circuit board is needed through designing to compensate the length differences of the paired differential signal lines in the cable, thereby increasing difficulties of design of the lines of the circuit board. Moreover, since the cable is bent for about 90 degrees at the rear side of the circuit board and then is welded to the circuit board, a space for bending the cable needs to be reserved in the connector assembly, resulting in difficulties in miniaturization of the connector.

Furthermore, in high-power signal transmission, a power plug needs to be added to provide extra power, but it is not intended to bend the differential signal lines to leave space for the power plug. Therefore, the forgoing discussed problems in the designs of the circuit board exist.

Therefore, a heretofore unaddressed need exists in the art to address the aforementioned deficiencies and inadequacies.

SUMMARY OF THE INVENTION

In one aspect, the present invention is directed to a connector assembly that can simplify the design of lines of a circuit board.

In one embodiment of the present invention, a connector assembly includes a circuit board, a signal plug, and a cable. The circuit board has at least one pair of first traces of the same length. A first signal contact and a second signal contact are respectively disposed at two ends of each of the first traces, and the paired first signal contacts and the paired second signal contacts are respectively arranged in a front-rear direction. The signal plug is disposed at a front side of the circuit board. The signal plug has at least one pair of first terminals of the same length that are respectively conducted to the paired first signal contacts. The cable extends from the circuit board in a left-right direction and is conducted to the circuit board. An extension direction of the cable is substantially perpendicular to an insertion direction of the signal plug. The cable includes at least one pair of first differential signal lines that are respectively conducted to the paired second signal contacts correspondingly.

Compared with the related art, in the present invention, the differential signal lines are set to be directly conducted to the circuit board in the left-right direction without being bent, thereby ensuring that the lengths of the differential signal lines are the same. Accordingly, in the design of the traces of the circuit board, the lengths of the paired traces are the same, and it is not necessary to compensate the length difference of the corresponding differential signal lines, thereby significantly simplifying the design of the lines of the circuit board. Meanwhile, the lengths of the paired first signal terminals are also the same, so total transmission paths of a pair of differential signals are the same, thereby ensuring synchronous transmission of paired differential signals.

In another aspect, the present invention is directed to a connector assembly that can be used to transmit high-power differential signals and can simplify design of lines of a circuit board.

In one embodiment of the present invention, a connector assembly includes a circuit board, a signal plug, and a cable. The circuit board has at least one pair of first traces of the same length. A first signal contact and a second signal contact are respectively disposed at two ends of each of the first traces, and the paired first signal contacts and the paired second signal contacts are respectively arranged in a front-rear direction. The signal plug is disposed at a front side of the circuit board. The signal plug has at least one pair of first terminals of the same length that are respectively conducted to the paired first signal contacts. The cable has a power line. A power plug is disposed at an end of the power line. At least one pair of first differential signal lines are further disposed in the cable, and the power plug and the at least one pair of first differential signal lines are respectively disposed at left and right sides of the circuit board. The at least one pair of first differential signal lines extend and are conducted to the corresponding second signal contacts on the circuit board, and an extension direction of the cable is substantially perpendicular to an insertion direction of the signal plug.

Compared with the related art, in the present invention, based on the plug with a simply designed circuit board, a power plug is further added, so that an additional power support can be provided when high-power signals need to be transmitted. Moreover, since the power plug and the differential signal lines are respectively disposed at the left and right sides of the circuit board, no interference occurs between the power line and the differential signal lines in spatial arrangement. Therefore, the differential signal lines need not to be bent to bypass the power line and the power plug, so the foregoing simplified design can be implemented successfully.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
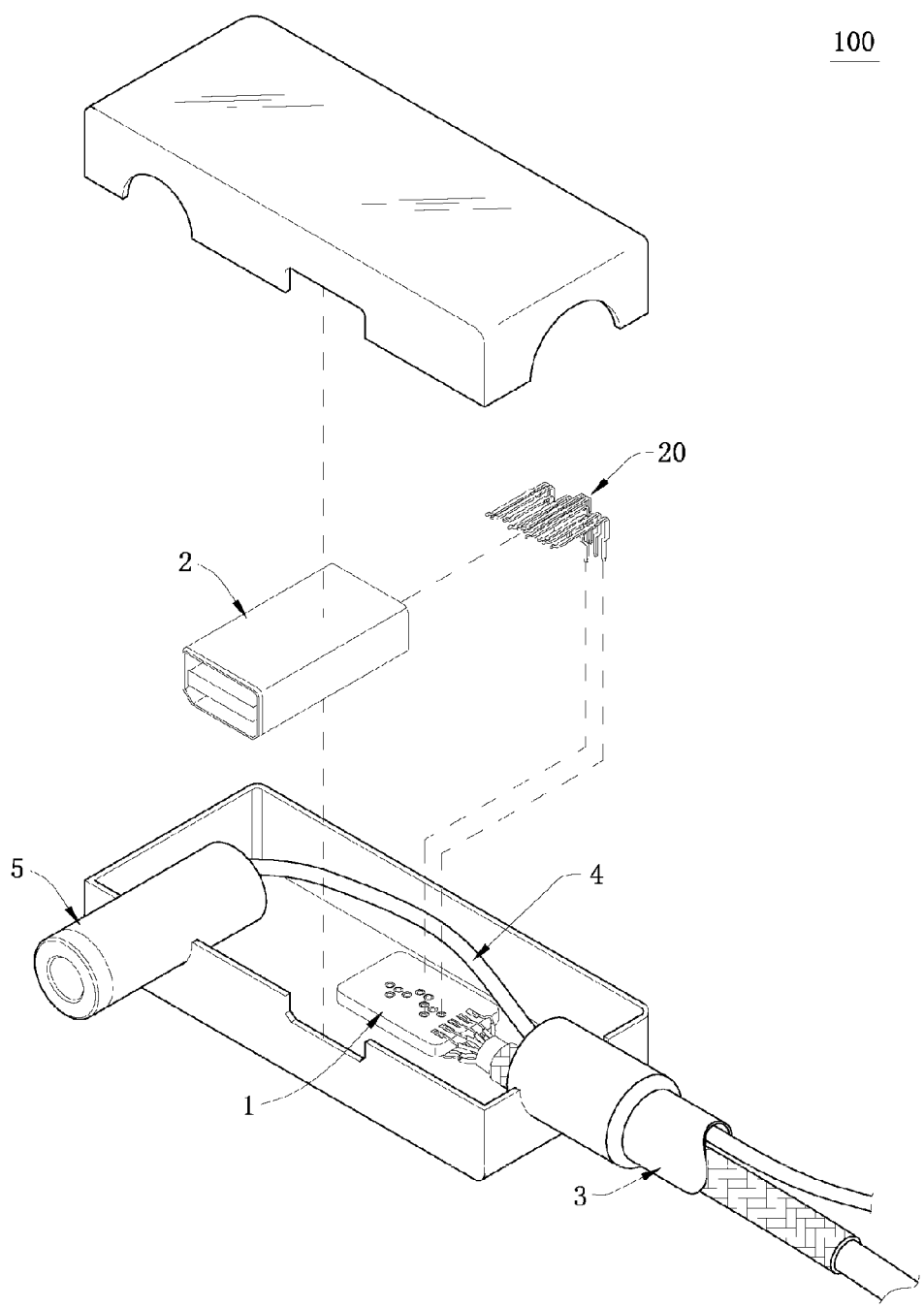
FIG. 1 is a schematic exploded view of a connector assembly according to the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. As used herein, if any, the terms "up", "down", "top", "bottom", "left", "right", "front", "rear" or other terms showing relative positions of structural elements, are merely provided to show the relative positions or directions for an observer viewing the structure from a certain position. It should be appreciated that the relative positions or directions of these structural elements may be different to observers from different positions without changing the positional or directional relationships of the elements. Moreover, titles or subtitles may be used in the specification for the convenience of a reader, which shall have no influence on the scope of the present invention.

Referring to FIGS. 1-6, a connector assembly 100 according to a first embodiment of the present invention is shown.

Figure 2:
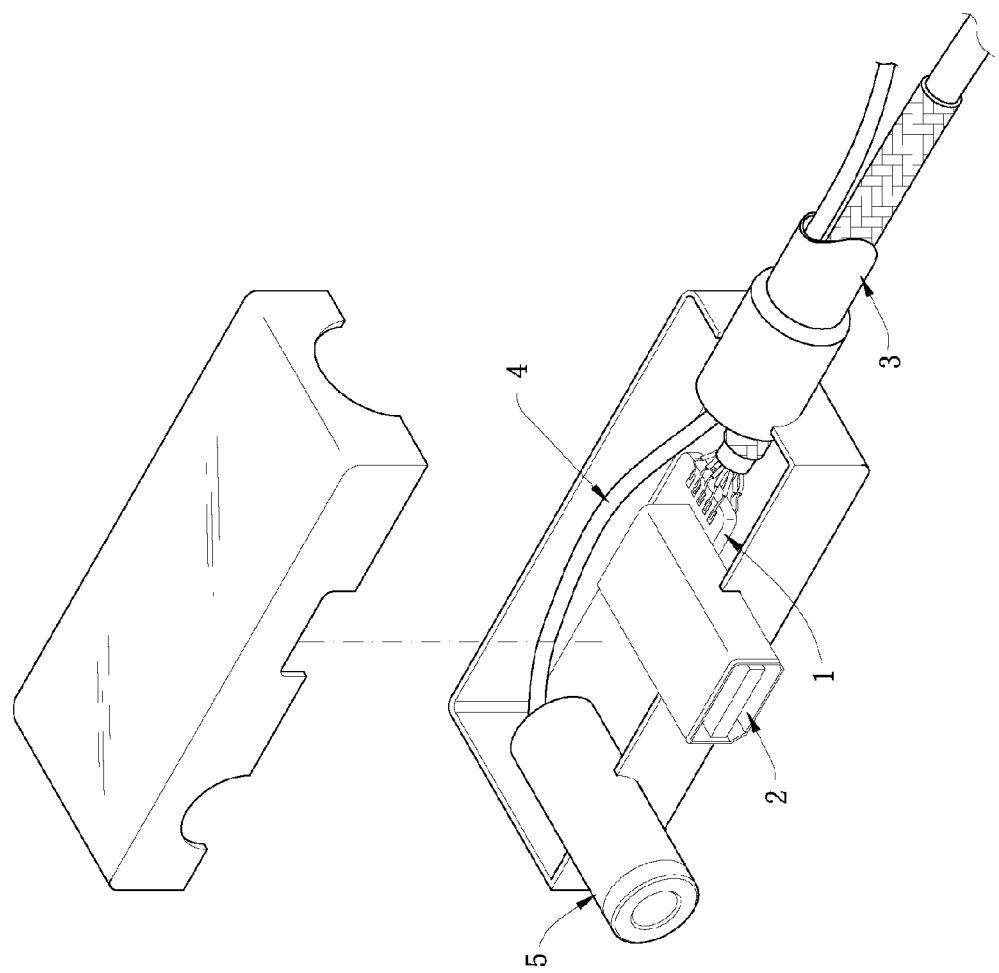
FIG. 2 is a schematic view of a signal plug in FIG. 1 assembled on a circuit board.
Figure 3:
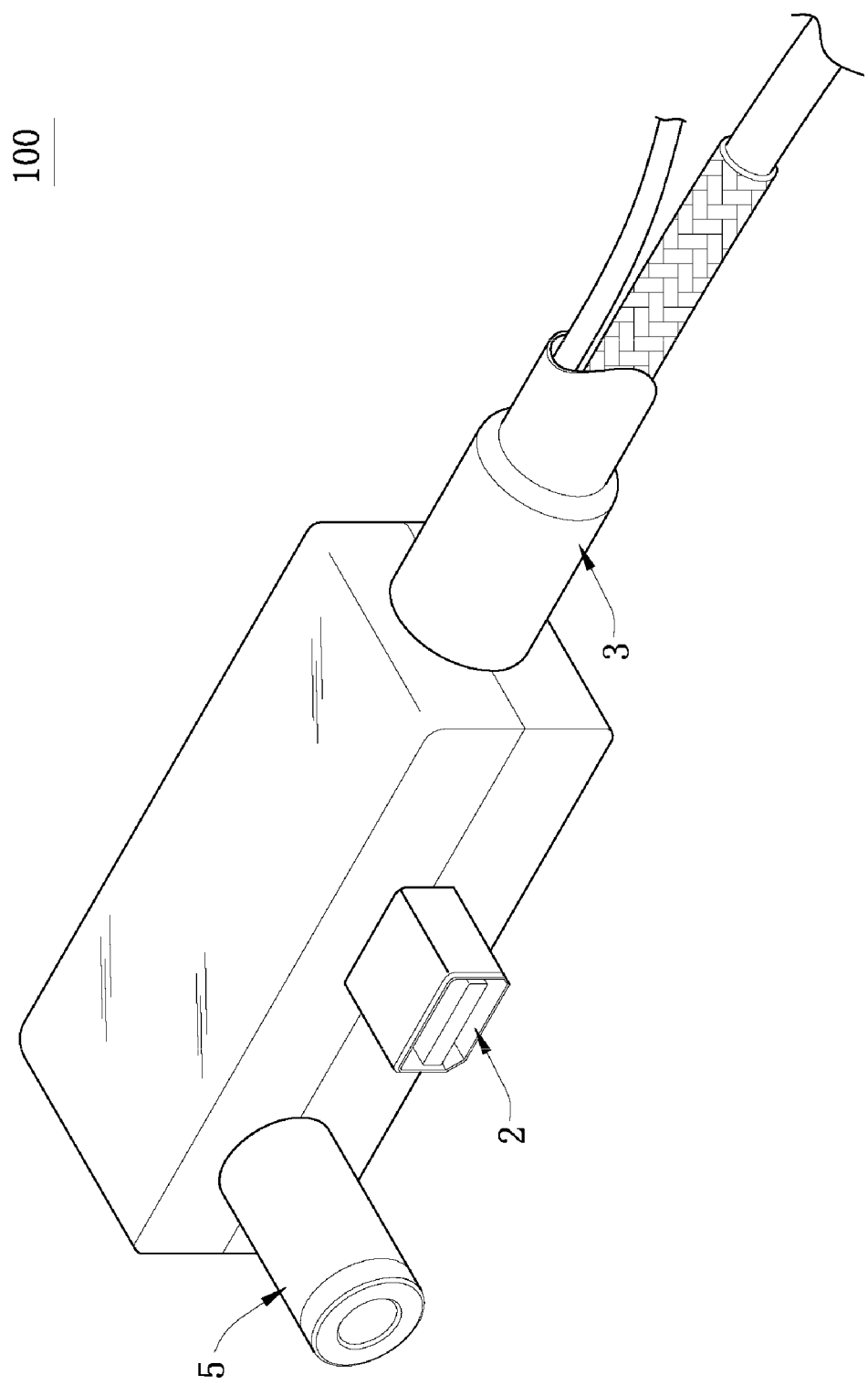
FIG. 3 is a three-dimensional assembly view of FIG. 1.

Referring now to FIGS. 1-3, the connector assembly 100 according to this exemplary embodiment includes the circuit board 1, a signal plug 2 disposed at a front side of the circuit board 1, and a cable 3. The signal plug 2 has a terminal group 20. The terminal group 20 is installed on the circuit board 1. An extension direction of the cable 3 is substantially perpendicular to an insertion direction of the signal plug 2. The signal plug 2 and the cable 3 are conducted via the circuit board 1. The cable 3 has a power line 4. A power plug 5 is disposed at an end of the power line 4. The power plug 5 and the cable 3 are respectively disposed at left and right sides of the circuit board 1.

Figure 4:
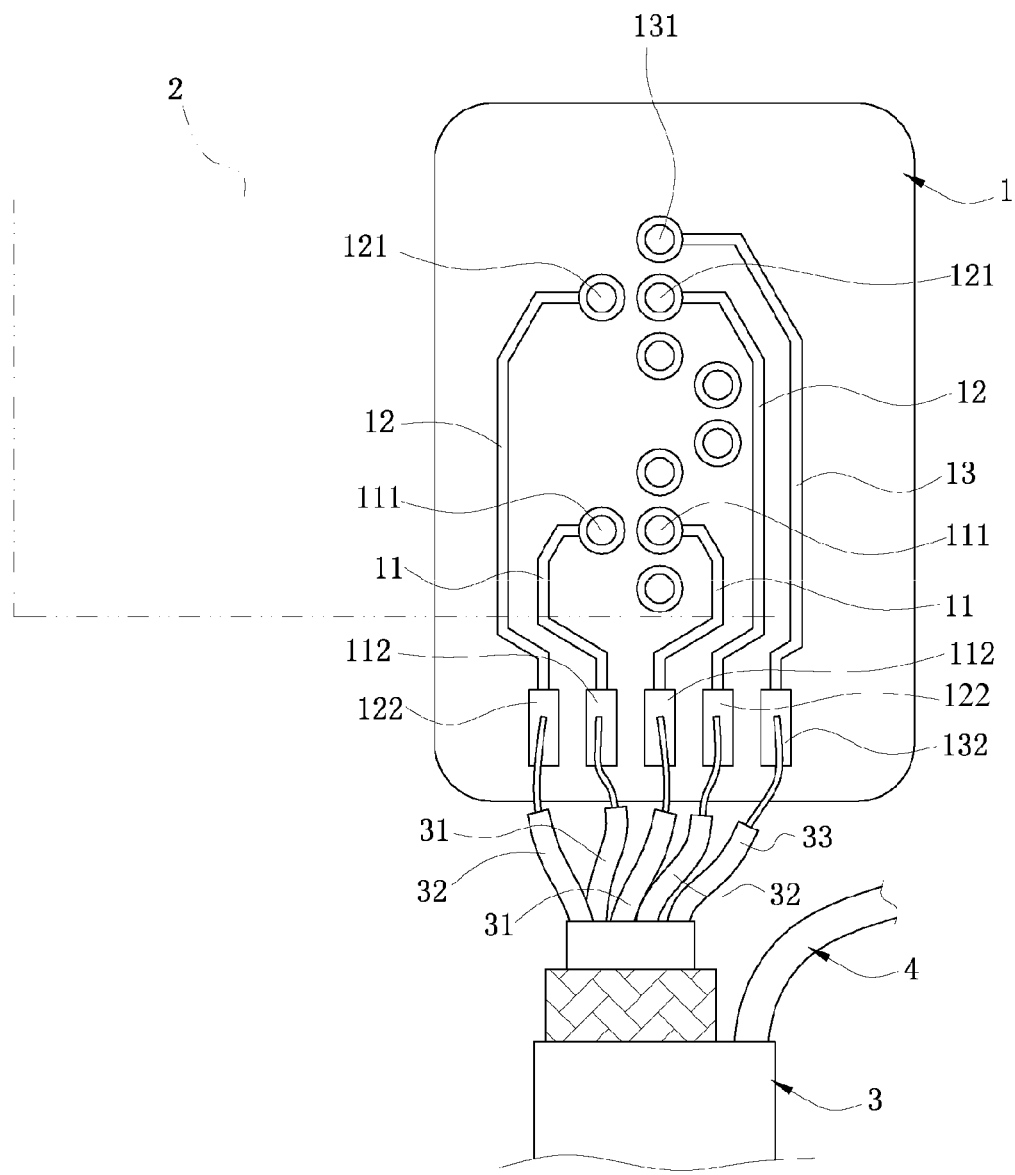
FIG. 4 is a schematic top wiring view of a circuit board according to the present invention.
Figure 5:
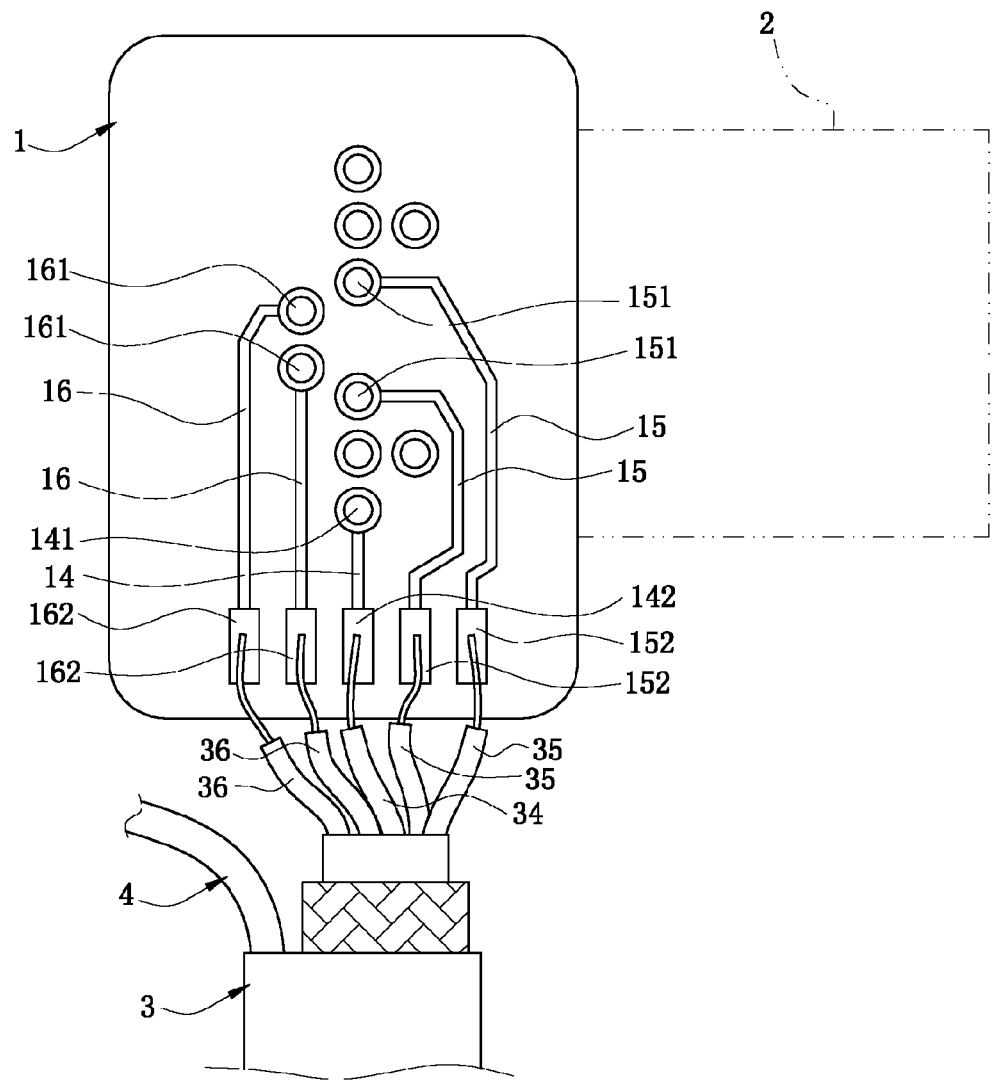
FIG. 5 is a schematic bottom wiring view of a circuit board according to the present invention.
Figure 6:
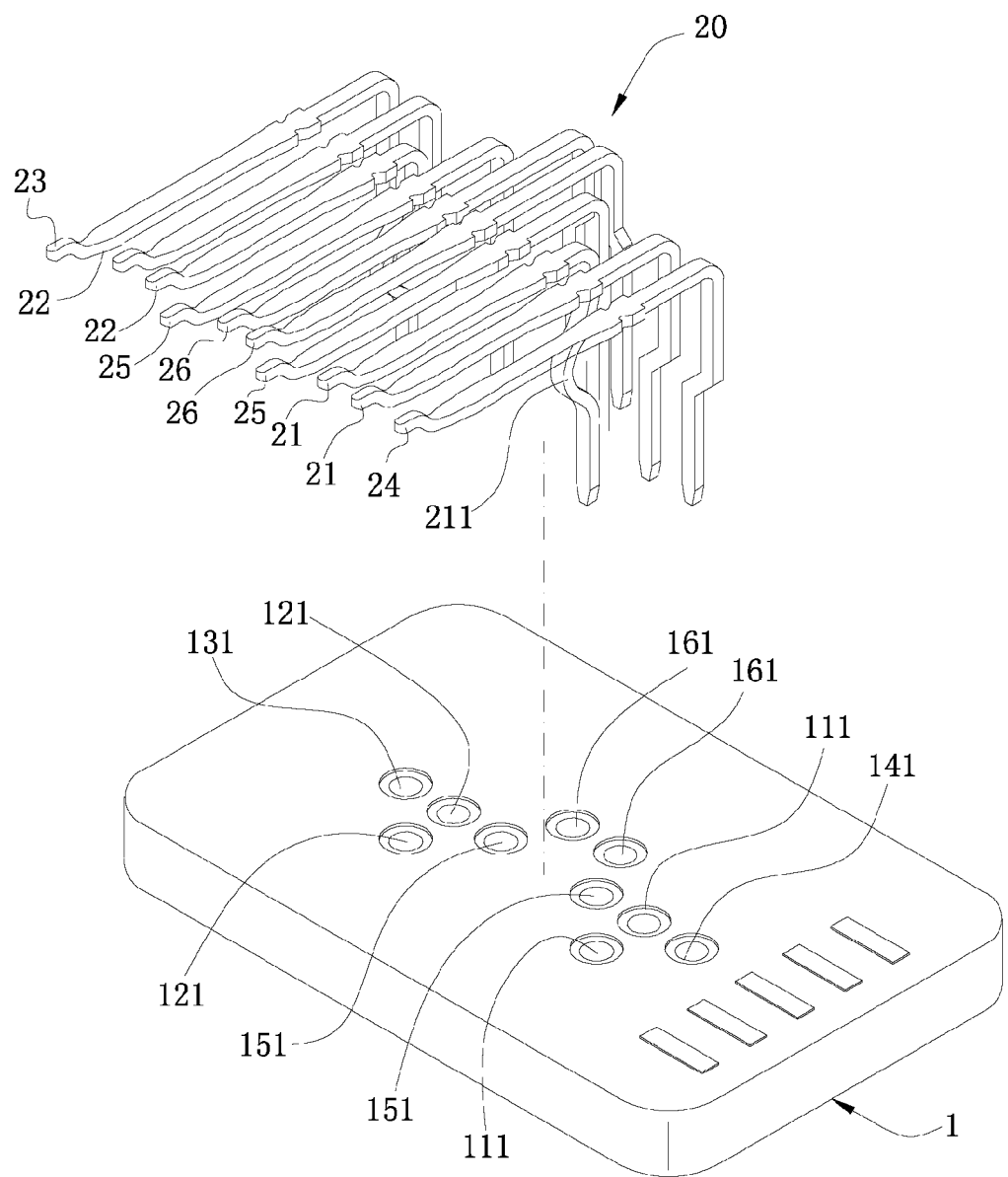
FIG. 6 is a schematic exploded view of a terminal and a circuit board according to the present invention.

As shown in FIGS. 4-6, the circuit board 1 has a pair of first traces 11 of the same length. A first signal contact 111 and a second signal contact 112 are respectively disposed at two ends of each of the first traces 11. The paired first signal contacts 111 and the paired second signal contacts 112 are respectively arranged in a front-rear direction, and the paired first signal contacts 111 and the paired second signal contacts 112 are arranged in a rectangular form. The terminal group 20 includes a pair of first terminals 21 of the same length that are respectively conducted to the paired first signal contacts 111 correspondingly. The pair of first terminals 21 has different shapes. The front first terminal 21 has a compensation section 211, so that the length of the front first terminal 21 is equal to that of the rear first terminal 21. A pair of first differential signal lines 31 are further disposed in the cable 3, and the power plug 5 and the pair of first differential signal lines 31 are respectively disposed at the left and right sides of the circuit board 1. The pair of first differential signal lines 31 extend and are conducted to the corresponding second signal contacts 112 on the circuit board 1.

In order to further improve signal transmission rate, a pair of differential signals need to be added, so the circuit board 1 further includes a pair of second traces 12 of the same length. A third signal contact 121 and a fourth signal contact 122 are respectively disposed at two ends of each of the second traces 12. The paired third signal contacts 121 and the paired fourth signal contacts 122 are respectively arranged in the front-rear direction. The paired third signal contacts 121 and the paired second signal contacts 112 are respectively located at left and right sides of the paired first signal contacts 111. The paired third signal contacts 121 and the paired first signal contacts 111 are arranged in a rectangular form. The paired fourth signal contacts 122 are symmetrically distributed at front and rear sides of the paired second signal contacts 112. The terminal group 20 includes a pair of second terminals 22 of the same length that are respectively conducted to the paired third signal contacts 121 correspondingly. The cable 3 includes a pair of second differential signal lines 32 that are respectively conducted to the paired fourth signal contacts 122 correspondingly.

In order to ensure stable transmission of signals and meet requirements of tests, the signal plug 2 needs to be supported by a certain power, and a test for the differential signal is mainly a test of resistance of a transmission path, so a ground point is required to serve as a test standard. Therefore, a first power contact 131 and a first ground contact 141 are symmetrically distributed at the left and right sides of the first signal contact 111 and the third signal contact 121 that are located at the rear of the circuit board 1, respectively. A second power contact 132 is connected to the first power contact 131 via a third trace 13. The second power contact 132, the paired second signal contacts 112 and the paired fourth signal contacts 122 are arranged in a row on a top surface of the circuit board 1. A second ground contact 142 is connected to the first ground contact 141 via a fourth trace 14. The second ground contact 142 is disposed on the bottom surface of the circuit board 1 and is close to a side of the cable 3. The cable 3 includes a first ground conducting wire 34 that is conducted to the second ground contact 142 and a low-power power line 33 that is conducted to the second power contact 132. The terminal group 20 includes a first ground terminal 24 that is correspondingly installed on the first ground contact 141, and a power terminal 23 that is correspondingly installed on the first power contact 131.

During the transmission of two pairs of differential signals, certain shielding measures are required to reduce the interference between the two pairs of differential signals, so a pair of third ground contacts 151 is distributed between the first signal contact 111 and the third signal contact 121 that are located at the rear of the circuit board 1. A pair of fourth ground contacts 152 is connected to the pair of third ground contacts 151 via a pair of fifth traces 15. The pair of fourth ground contacts 152 and the second ground contact 142 are located on the same surface of the circuit board 1. The terminal group 20 includes a pair of second ground terminals 25 that are correspondingly installed on the pair of third ground contacts 151. The cable 3 includes a pair of second ground conducting wires 35 that are correspondingly conducted to the pair of fourth ground contacts 152.

In considering diversification of information processing, the connector assembly 100 of this embodiment further provides a transmission line for low-speed signals. That is, a pair of first low-speed signal contacts 161 is further disposed on the circuit board 1, and located at a rear side of a connection line of the first power contact 131 and the first ground contact 141. The pair of the first low-speed signal contacts 161 is distributed in the left-right direction. A pair of second low-speed signal contacts 162 is connected to the pair of first low-speed signal contact 161 via a pair of sixth traces 16. The pair of second low-speed signal contacts 162 and the second ground contact 142 are located on the same board surface of the circuit board 1. The second ground contact 142, the pair of fourth ground contacts 152 and the pair of second low-speed signal contacts 162 are linearly arranged in the front-rear direction. The terminal group 20 includes a pair of low-speed signal terminals 26 that are installed on the pair of first low-speed signal contacts 161. The cable 3 includes a pair of low-speed signal lines 36 that correspondingly conducted to the pair of second low-speed signal contacts 162.

Furthermore, a woven layer is further disposed in the cable 3 to wrap all the wires except the power line 4, so that the interference of high-power current in the power line 4 to signals of all the other wires can be reduced.

In other embodiments (not shown), the connector assembly 100 may not have the power plug 5 or the power line 4, and when a high-power signal needs to be transmitted, a power plug 5 may be additionally equipped for the connector 100.

In view of the above, the connector assembly 100 of the present invention, among other things, has the following beneficial effects:

Compared with the related art, in the present invention, the paired first differential signal lines 31 are set to be directly conducted to the circuit board 1 in the left-right direction without being bent, thereby ensuring that the lengths of the paired first differential signal lines 31 are the same. Accordingly, in the design of the first traces 11 of the circuit board 1, the lengths of the paired first traces 11 are the same, and it is not necessary to compensate the length difference of the corresponding differential signal lines, thereby significantly simplifying the design of lines of the circuit board. Meanwhile, the lengths of the paired first signal terminals 21 are also the same, so the total transmission paths of a pair of differential signals are the same, thereby ensuring synchronous transmission of paired differential signals. In the present invention, based on the connector assembly 100 with a simply designed circuit board 1, a power plug 5 is further added, so that additional power support can be provided when high-power signals need to be transmitted. Moreover, since the power plug 5 and the differential signal lines are respectively disposed at the left and right sides of the circuit board 1, no interference occurs between the power line 4 and the differential signal lines in spatial arrangement. Therefore, the differential signal lines need not to be bent to bypass the power line 4 and the power plug 5, so the foregoing simplified design can be implemented successfully.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A connector assembly, comprising:
   a circuit board, having
      at least one pair of first traces of the same length, wherein a first signal contact and a second signal contact are respectively disposed at two ends of each of the first traces, the paired first signal contacts and the paired second signal contacts are respectively arranged in a front-rear direction; and
      a pair of second traces of the same length, wherein a third signal contact and a fourth signal contact are respectively disposed at two ends of each of the second traces, the paired third signal contacts and the paired fourth signal contacts are respectively arranged in the front-rear direction;
   a signal plug, disposed at a front side of the circuit board, comprising
      at least one pair of first terminals of the same length respectively conducted to the paired first signal contacts, wherein the pair of first terminals has different shapes, and the front first terminal has a compensation section; and
      a pair of second terminals of the same length that are respectively conducted to the paired third signal contacts; and
   a cable, extending from the circuit board in a left-right direction and conducted to the circuit board, wherein an extension direction of the cable is substantially perpendicular to an insertion direction of the signal plug, and the cable comprises
      at least one pair of first differential signal lines respectively conducted to the paired second signal contacts; and
      a pair of second differential signal lines respectively conducted to the paired fourth signal contacts.

2. The connector assembly according to claim 1, wherein the paired third signal contacts and the paired second signal contacts are respectively located at left and right sides of the paired first signal contacts.

3. The connector assembly according to claim 2, wherein the paired third signal contacts and the paired first signal contacts are arranged in a rectangular form.

4. The connector assembly according to claim 3, wherein the paired fourth signal contacts are symmetrically distributed at front and rear sides of the paired second signal contacts.

5. The connector assembly according to claim 4,
   wherein a first power contact and a first ground contact are symmetrically distributed at left and right sides of the first signal contact and the third signal contact that are located at rear of the circuit board;
   wherein a second power contact is connected to the first power contact via a third trace, and the second power contact, the paired second signal contacts and the paired fourth signal contacts are arranged in a row on a top surface of the circuit board;

wherein a second ground contact is connected to the first ground contact via a fourth trace, the second ground contact is disposed on a bottom surface of the circuit board and is close to a side of the cable;

wherein the cable comprises a first ground conducting wire that is conducted to the second ground contact and a low-power power line that is conducted to the second power contact; and wherein the signal plug has a first ground terminal that is correspondingly installed on the first ground contact, and a power terminal that is correspondingly installed on the first power contact.

6. The connector assembly according to claim 5, wherein a pair of third ground contacts are distributed between the first signal contact and the third signal contact that are located at rear of the circuit board;

wherein a pair of fourth ground contacts are connected to the pair of third ground contacts via a pair of fifth traces, the pair of fourth ground contacts and the second ground contact are located at the same surface of the circuit board;

wherein the signal plug has a pair of second ground terminals that are correspondingly installed on the pair of third ground contacts; and wherein the cable comprises a pair of second ground conducting wires that are correspondingly conducted to the pair of fourth ground contacts.

7. The connector assembly according to claim 6, wherein a pair of first low-speed signal contacts are further disposed on the circuit board, and are located at a rear side of a connection line of the first power contact and the first ground contact, the pair of first low-speed signal contacts are distributed in the left-right direction;

wherein a pair of second low-speed signal contacts are connected to the pair of first low-speed signal contacts via a pair of sixth traces, and the pair of second low-speed signal contacts and the second ground contact are located on the same surface of the circuit board;

wherein the signal plug has a pair of low-speed signal terminals that are correspondingly installed on the pair of first low-speed signal contacts; and wherein the cable comprises a pair of low-speed signal lines that are correspondingly conducted to the pair of second low-speed signal contacts.

8. The connector assembly according to claim 7, wherein the second ground contact, the pair of fourth ground contacts and the pair of second low-speed signal contacts are linearly arranged in the front-rear direction.

9. A connector assembly, comprising:

a circuit board, having at least one pair of first traces of the same length, wherein a first signal contact and a second signal contact are respectively disposed at two ends of each of the first traces, the paired first signal contacts and the paired second signal contacts are respectively arranged in a front-rear direction;

a signal plug, disposed at a front side of the circuit board, wherein the signal plug has at least one pair of first terminals of the same length that are respectively conducted to the paired first signal contacts; and a cable, having a power line, wherein a power plug is disposed at an end of the power line, at least one pair of first differential signal lines are further disposed in the cable, the power plug and the at least one pair of first differential signal lines are respectively disposed at left and right sides of the circuit board, the at least one pair of first differential signal lines extend and are conducted to the corresponding second signal contacts on the circuit board, and an extension direction of the cable is substantially perpendicular to an insertion direction of the signal plug.

10. The connector assembly according to claim 9, wherein the pair of first terminals have different shapes, and the front first terminal has a compensation section.

11. The connector assembly according to claim 10, wherein the circuit board has a pair of second traces of the same length, a third signal contact and a fourth signal contact are respectively disposed at two ends of each of the second traces, the paired third signal contacts and the paired fourth signal contacts are respectively arranged in the front-rear direction;

wherein the signal plug has a pair of second terminals of the same length that are respectively conducted to the paired third signal contacts; and wherein the cable comprises a pair of second differential signal lines that are respectively conducted to the paired fourth signal contacts correspondingly.

12. The connector assembly according to claim 11, wherein the paired third signal contacts and the paired second signal contacts are respectively located at left and right sides of the paired first signal contacts.

13. The connector assembly according to claim 12, wherein the paired third signal contacts and the paired first signal contacts are arranged in a rectangular form.

14. The connector assembly according to claim 13, wherein the paired fourth signal contacts are symmetrically distributed at front and rear sides of the paired second signal contacts.

15. The connector assembly according to claim 14, wherein a first power contact and a first ground contact are symmetrically distributed at left and right sides of the first signal contact and the third signal contact that are located at rear of the circuit board;

wherein a second power contact is connected to the first power contact via a third trace, and the second power contact, the paired second signal contacts and the paired fourth signal contacts are arranged in a row on a top surface of the circuit board;

wherein a second ground contact is connected to the first ground contact via a fourth trace, the second ground contact is disposed on a bottom surface of the circuit board and is close to a side of the cable;

wherein the cable comprises a first ground conducting wire that is conducted to the second ground contact and a low-power power line that is conducted to the second power contact; and wherein the signal plug has a first ground terminal that is correspondingly installed on the first ground contact, and a power terminal that is correspondingly installed on the first power contact.

16. The connector assembly according to claim 15, wherein a pair of third ground contacts are distributed between the first signal contact and the third signal contact that are located at rear of the circuit board;

wherein a pair of fourth ground contacts are connected to the pair of third ground contacts via a pair of fifth traces, the pair of fourth ground contacts and the second ground contact are located on the same surface of the circuit board;

wherein the signal plug has a pair of second ground terminals that are correspondingly installed on the pair of third ground contacts; and wherein the cable comprises a pair of second ground conducting wires that are correspondingly conducted to the pair of fourth ground contacts.

17. The connector assembly according to claim 16,
  wherein a pair of first low-speed signal contacts are disposed on the circuit board, and are located at a rear side of a connection line of the first power contact and the first ground contact, the pair of first low-speed signal contacts are distributed in a left-right direction;
  wherein a pair of second low-speed signal contacts are connected to the pair of first low-speed signal contacts via a sixth trace, the pair of second low-speed signal contacts and the second ground contact are located on the same surface of the circuit board;
  wherein the signal plug has a pair of low-speed signal terminals that are correspondingly installed on the pair of first low-speed signal contacts; and
  wherein the cable comprises a pair of low-speed signal lines that are correspondingly conducted to the pair of second low-speed signal contacts.

18. The connector assembly according to claim 17, wherein the second ground contact, the pair of fourth ground contacts and the pair of second low-speed signal contacts are linearly arranged in the front-rear direction.

* * * * *